(12) United States Patent
Lewis

(10) Patent No.: US 8,154,440 B2
(45) Date of Patent: Apr. 10, 2012

(54) GPS PATHFINDER CELL PHONE AND METHOD

(75) Inventor: Scott Lewis, West Palm Beach, FL (US)

(73) Assignee: Pathfinders International, LLC, West Palm Beach, FL (US)

(*) Notice: Subject to any disclaimer, the term of this patent is extended or adjusted under 35 U.S.C. 154(b) by 389 days.

(21) Appl. No.: 12/410,003

(22) Filed: Mar. 24, 2009

(65) Prior Publication Data
US 2009/0182587 A1 Jul. 16, 2009

Related U.S. Application Data

(63) Continuation-in-part of application No. 11/696,532, filed on Apr. 4, 2007, now abandoned.

(51) Int. Cl.
G01S 19/03 (2010.01)
G01S 19/17 (2010.01)
G08B 1/08 (2006.01)

(52) U.S. Cl. ........... 342/357.4; 342/357.55; 340/539.13; 340/539.2

(58) Field of Classification Search ............. 342/357.55, 342/357.4; 340/539.13, 539.2
See application file for complete search history.

(56) References Cited

U.S. PATENT DOCUMENTS

| | | | |
|---|---|---|---|
| 4,956,875 A | 9/1990 | Bernard et al. | |
| 5,278,539 A | 1/1994 | Lauterbach et al. | |
| 5,555,286 A | 9/1996 | Tendler | |
| 5,619,412 A | 4/1997 | Hapka | |
| 5,628,050 A | 5/1997 | McGraw et al. | |
| 5,848,373 A | 12/1998 | DeLorme et al. | |
| 6,141,609 A * | 10/2000 | Herdeg et al. | 701/35 |
| 6,268,798 B1 | 7/2001 | Dymek et al. | |
| 6,292,724 B1 | 9/2001 | Apsell et al. | |
| 6,373,430 B1 | 4/2002 | Beason et al. | |
| 6,574,561 B2 | 6/2003 | Alexander et al. | |
| 6,693,586 B1 * | 2/2004 | Walters et al. | 342/357.4 |
| 6,765,528 B2 | 7/2004 | Tranchina et al. | |
| 6,865,476 B1 | 3/2005 | Jokerst, Sr. | |
| 6,868,320 B1 * | 3/2005 | Burch | 701/35 |
| 6,868,340 B2 | 3/2005 | Alexander et al. | |
| 6,999,876 B2 | 2/2006 | Lambert et al. | |
| 7,068,163 B2 | 6/2006 | Sari et al. | |

(Continued)

Primary Examiner — Gregory C Issing
(74) Attorney, Agent, or Firm — McHale & Slavin, P.A.

(57) ABSTRACT

A device and system for use in emergency management operations before and after a disaster. The device incorporates a GPS and a radio with very simplified, pre-programmed instructions which are uploaded automatically in the device's memory via wireless technology prior to the unit's first use at a disaster site. Maps of areas to be searched are uploaded into the device and the areas covered during the search are retained in the devices' memory. A unique feature enables the searcher to quickly indicate a specific need or service at a particular location during the search, which information automatically is geocoded and time/date stamped once the user saves the information inputted. Via wireless technology areas that have been searched during an operational period are downloaded to a base unit and areas to be searched the following operational period are uploaded to the portable units at the beginning of the day. Radios on the units can enable the searchers to audibly communicate with each other without cell towers. The system can be employed by cleanup teams, insurance adjusters, and any number of post incident response teams both focused on short and long term recovery operations. The entire system is designed to be self contained to operate when normal cell and Internet systems are damaged or destroyed. The system can quickly organize, sort, and edit the data collected by field users for daily and future analysis and documentation or any and all disaster operations.

6 Claims, 10 Drawing Sheets

U.S. PATENT DOCUMENTS

| | | | |
|---|---|---|---|
| 7,142,900 B1 * | 11/2006 | Straub | 455/701 |
| 7,143,130 B2 * | 11/2006 | Lin | 709/203 |
| 7,822,816 B2 | 10/2010 | Payne | |
| 2002/0152028 A1 | 10/2002 | Motoyama et al. | |
| 2002/0173909 A1 | 11/2002 | Verbil | |
| 2003/0080897 A1 * | 5/2003 | Tranchina et al. | 342/357.1 |
| 2004/0225432 A1 | 11/2004 | Pilley et al. | |
| 2005/0114015 A1 | 5/2005 | Motoyama et al. | |
| 2005/0116858 A1 | 6/2005 | Odamura | |
| 2005/0210131 A1 | 9/2005 | Motoyama et al. | |
| 2005/0212701 A1 | 9/2005 | Nimmo | |
| 2005/0253753 A1 | 11/2005 | Lalik et al. | |
| 2005/0288854 A1 | 12/2005 | Kitajima | |
| 2006/0079200 A1 | 4/2006 | Hirouchi et al. | |
| 2006/0148423 A1 | 7/2006 | Sharpe | |

* cited by examiner

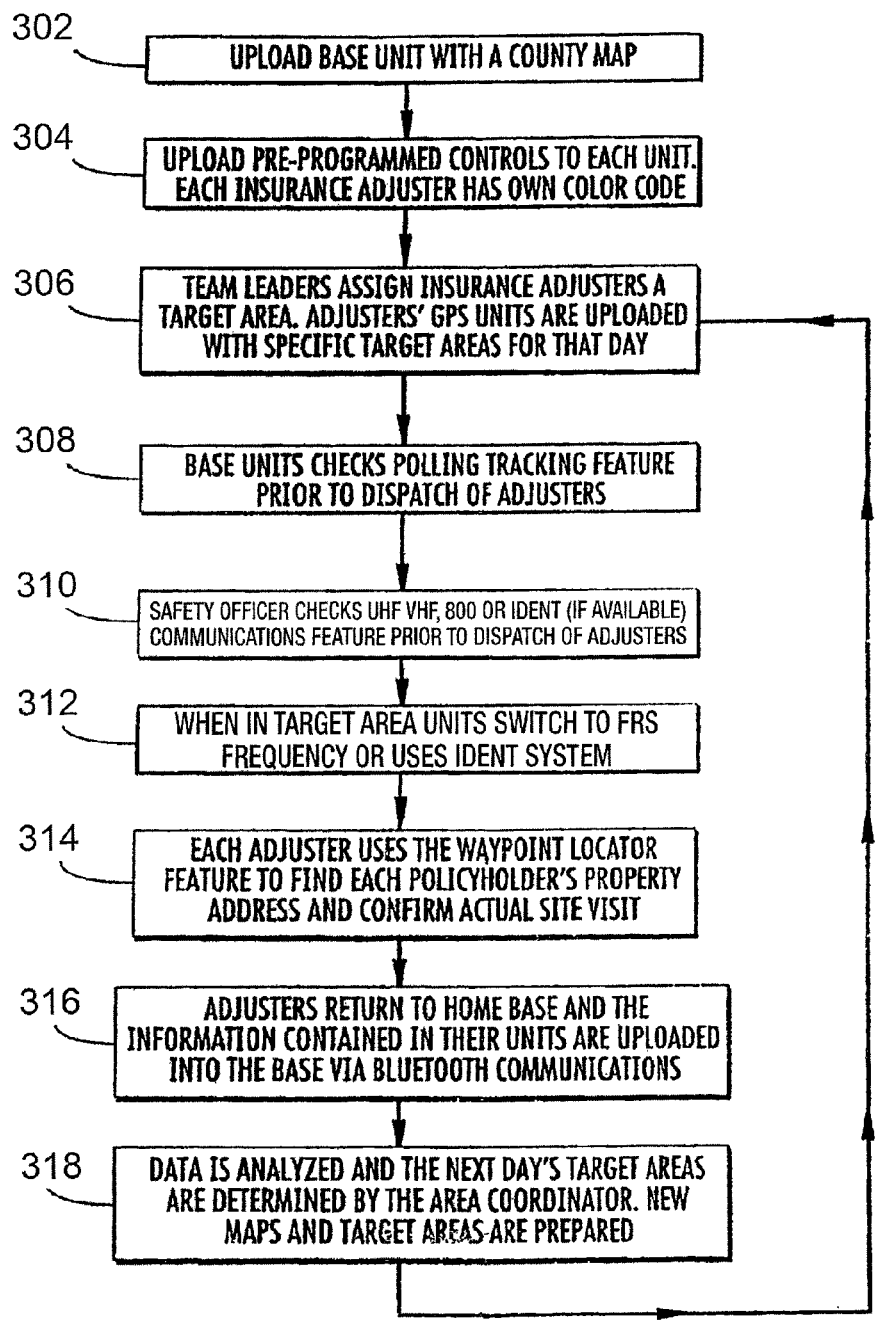

GPS PATHFINDER CELL PHONE AND METHOD

RELATED APPLICATIONS

This application is a continuation-in-part of application Ser. No. 11/696,532, filed Apr. 4, 2007 now abandoned, entitled, "GPS PATHFINDER METHOD AND DEVICE", the entirety of which is incorporated herein by reference.

FIELD OF THE INVENTION

The present invention relates to a system for a variety of operations before and after a disaster. The system is designed to be used by a wide variety of responders to methodically search for victims in areas affected by disasters, collect rapid human needs and property damage assessments, and identify and deliver unmet needs to the vulnerable populations. Field operations are precisely documented by geocoding and time/date stamps as well as are retained within the system for future analysis.

BACKGROUND OF THE INVENTION

The present invention relates to a disaster response and recovery system which incorporates a methodical approach to a variety of disaster operations. The system is designed so that individuals unfamiliar with the affected disaster areas can easily navigate these areas and readily record locations wherein specific assistance is required. The present invention relates to a cellular phone equipped with mobile software capacity, a Global Positioning System (GPS) receiver, GPS functions, and Bluetooth®, which system is designed to work when the cell towers are damaged or destroyed.

Until recently, with the ready access and low cost of GPS devices, it was very difficult and sometimes impossible to perform adequate disaster operations in areas that have been totally devastated by natural disasters such as hurricanes or earthquakes. Extremely large hurricanes such as Katrina in Mississippi and Louisiana and Andrew in South Florida have resulted in total destruction and devastation in the areas they have hit. After these two hurricanes there were no homes, buildings, street signs or other landmarks left standing so that an individual could pinpoint their location or indicate to other individuals where assistance was required. The flooding caused by Hurricane Katrina in New Orleans left the city and surrounding areas in the same condition, with no points of reference. Conventional maps become useless in these situations because they rely on points of reference at specific locations on the ground.

The recent developments in GPS have resulted in GPS devices that are small enough to be hand held. Improved location software and access to Wide Area Augmentation System (WAAS) have enabled the determination of the position of an object to within one meter or three feet of its actual location. These GPS devices do not require any landmarks or reference points to determine the location of an object. Thus, once the object's longitude and latitude have been recorded in the device it is relative easy to return to the same location using these coordinates. The longitude and latitude of an object is known as its waypoint. Software has been developed which enables the generation of electronic maps from waypoints of known locations. These maps are the ones which are commonly used in the navigation systems found on many of today's automobiles. The location of the cursor representing the GPS unit on the navigation map is the result of real time, way point determination.

In addition to the growing popularity and demand for GPS navigational devices, portable two-way radios are once again enjoying widespread popularity. In 1996 the Federal Communications Commission (FCC) established the Family Radio Service (FRS) in order for families and other small groups to be able to communicate with one another over very small distances (usually less than two miles) at no charge and without the need for an FCC license. Another service is the General Mobile Radio Service (GMRS). This is a personal radio service available for the conduct of an individual's personal and family communications. It operates in the UHF frequency band. When combined with a repeater it can also be used for radio communications. Currently, there are a number of commercially available two-way radios which are designed for use with the FRS and the GMRS.

Recently the handheld GPS units have been combined with portable two-way radios which operate on the FRS and GMRS frequencies. These combination units enable small groups of individuals to be in the wilderness, amusement parks, sporting events, etc. while remaining in voice communication with each other.

Some of the problems associated with the currently available GPS/radio units include the operation of numerous controls and overly complex software designs, in addition to the radio controls, which must be operated to transmit location data between the units. In addition, most of the current units will only transmit their location data when the user of the units elects to do so. This can become a problem. For example, parents may want to monitor the location of their children in an amusement park, but can only do so if the children periodically transmit their location information back to their parents.

Another problem with these units is the lack of privacy. These units broadcast on the FRS which is an unlicensed, shared communication service and communications from different persons are normally transmitted simultaneously causing interference. This is true in areas where these units are popular such as amusement parks, sporting events and concerts. Many FRS and GMRS radios incorporate continuous tone coded squelch systems (CTCSS) to suppress the unwanted conversations. However, CTCSS does not prevent someone without CTCSS or someone who has turned their CTCSS off to overhear unwanted conversations. These unauthorized individuals can utilize the information they overhear to determine someone else's location.

Recently cellular telephones or cell phones, as they are commonly referred to, have been provided with GPS hardware and some GPS software to enable the user of the cellular phone to locate himself or herself. Also if the cellular phone is provided with the proper software, the cellular phone can be used for navigation. These GPS equipped cell phones have gained widespread popularity and some cell phones now incorporate BlueTooth® capability as well. Many of these cell phones operate on the CDMA (Code Division Multiple Access), TDMA (time division multiple access), or GSM (Global System for Mobile communication) wireless network standard. Some cell phones also operate on the IDENT network, commonly used on the push to talk phones like those that Nextel/Sprint use. Some IDENT cell phones also have been designed to function without cellular towers in a limited range for voice transmission over line of site communications.

Some of the problems associated with the currently available GPS/radio units include the operation of numerous controls and overly complex software designs, in addition to the radio controls, which must be operated to transmit location data between the units. In addition, most of the current units will only transmit their location data when the user of the unit elects to do so. This can be a problem. For example, parents may want to monitor the location of their children in an amusement park, but can only do so if the children periodically transmit their location information back to their parents.

DESCRIPTION OF THE PRIOR ART

A prior art device which combines a handheld GPS receiver and a radio is disclosed in U.S. Pat. No. 7,142,900, issued to Straub. The unit includes a GPS receiver and a radio transceiver. The GPS receiver operates in conjunction with cartographic data which is downloadable from cartridges. This enables the user to download a map of the immediate vicinity and determine their current location with respect thereto. The radio is a two-way radio which operates on the Family Radio Services (FRS) portion of the Citizens Band Radio Services. The broadcast range of these radios is generally two miles or less and they are commonly used by family and friends to keep in touch with each other in areas such as amusement parks and other recreational areas. The unit also has GMRS capability. This unit also has a "polling" function. This function is performed when a pushbutton or other device is activated to transmit a radio request to the other GPS/radio units to indicate their locations. The other units will automatically transmit their locations to the unit that had made the request. These locations can then be displayed on the requesting unit's display and the user can readily determine the locations of the other members of their party. While this unit can download a given day's track to a base unit, it does not have Bluetooth® technology and therefore must be hard wired to the base unit to store its track. Further, the use of the unit is far too complicated for the common user without prior instructions. In addition the user cannot associate a written description or code with a specific way point in the unit.

U.S. Pat. No. 6,268,798, issued to Dymek et al. discloses a locator system for firefighters which incorporates a GPS receiver and a memory. The firefighter activates the locator unit as he enters a building and the unit records his path through the building. Should he become disoriented or injured he can activate the memory in the unit and the unit will provide a reverse indication of the path that was traversed up to that point. By following these reverse directions the firefighter is able to safely exit the building. The unit can also communicate with a home base and transmit the path traversed by the firefighter to the home base so it can be uploaded to another unit. This second unit is employed by a rescuer into the building and by retracing the path the lost or injured firefighter is located. While these units can download a path traversed by a user, they are not equipped to be uploaded with a path to follow or an area to search. Further, they cannot associate a specific written condition or code with a way point.

U.S. Pat. No. 5,619,412, issued to Hapka discloses a remotely accessible engine on a vehicle. Control of the engine can be performed on the vehicle, by the vehicle operator, or from a remote location via satellite communications.

U.S. Pat. No. 6,292,724, issued to Apsell et al. disclose a system for monitoring the location, status, utilization and conditions of a widely geographically dispersed fleet of vehicles utilizing satellite positioning and communications and the Internet. The data obtained from the vehicles can be displayed at numerous locations.

U.S. Published Patent Application No. 2003/0080897, filed by Tranchina et al. discloses a combination GPS receiver and radio. The GPS receiver operates in conjunction with a memory to enable a user to retrace the path they had just traversed. This feature enables a user to return to their starting point without getting lost. The radio operates on the General Mobile Radio Service (GMRS) or Family Radio Service (FRS) portion of the Citizens Band Radio channels. The broadcast range of these radios is generally two miles or less. While these units can download a path traversed by a user, they are not equipped to be uploaded with a specific path to follow or an area to search. In addition they cannot associate a written description or code with a specific way point.

U.S. Pat. No. 6,574,561, issued to Alexander et al. discloses a system for automating the gathering of field information which describes the condition of specific locations at specific times utilizing a field information recording device which has a GPSW receiver for recording and assignment of the space-time coordinates as information is gathered.

U.S. Pat. No. 6,868,340, issued to Alexander et al. also discloses a system for automating the gathering of field information which describes the condition of specific locations at specific times utilizing a field information recording device which has a GPSW receiver for recording and assignment of the space-time coordinates as information is gathered. The information and space-time coordinates are transmitted to a management center for processing.

U.S. Pat. No. 6,999,876, issued to Lambert et al. discloses a system for providing centralized deployment and coordination of field assessment activities. An emergency management data processing system includes a field assessment database for storing and processing layered geospacial visual portrayal data and field surveillance attribute data.

U.S. Pat. No. 7,822,816, issued to Payne, discloses a method for the management of data collected from a remote computing device including: creating a questionnaire; transmitting the questionnaire to a remote computer; executing the questionnaire in the remote computer to prompt a user for responses to questions of the questionnaire; transmitting the responses available to a server via a network; and making the responses available on the Web.

Therefore what is needed in the art is a portable cellular phone which has GPS capabilities as well as Bluetooth® and which can be uploaded with a map of an area to be searched, after a disaster has occurred, and a method of recording the portions of the operation's area that the user will traverse during a given mission and track what has been searched over a given mission. Also, the portable unit should be capable of wirelessly downloading to a base unit the portions of the search areas that have not been covered during the day. Given the number of the units being used after an incident, hard wiring for uploads and downloads is not practical and is far too time consuming. The unit should also enable the user to input specific information and/or recovery needs without complicated commands, all of which needs to be downloaded rapidly to a base unit for efficiency of the operations. Finally and most importantly, the cell phone must be able to do all of these functions without any Internet or any cell towers functioning.

SUMMARY OF THE INVENTION

The present invention is a device and system for use in the various stages of operations before and after a disaster. The device incorporates a cell phone provided with GPS which can operate on either CDMA, GSM, TDMA and/or IDENT (push to talk) networks. Maps of areas to be searched are uploaded into the device and the areas covered during the search are retained in the device's memory. A unique feature enables the searcher to quickly indicate a specific need or service at a particular location during the search. Areas that have been searched during a day are downloaded to a base unit and areas to be searched the following day are uploaded to the portable units at the beginning of the next day—all via wireless technology. The software employed on the cell phones is designed to permit the cell phone to automatically or manually download the information stored as data to a laptop "server" or other device which functions as a "server" when the cell phone is within Bluetooth® communication range of the server computer. Likewise, customization of the forms on the cell phone can also be made via Bluetooth® communication from a server and/or a laptop "server". Thus the cell phones are "talking" or communicating directly to the laptop "servers" without the use of cell towers or the Internet, which totally disconnected environment is the setting or situation confronting responders in a major disaster. Maps of the areas to be searched are uploaded into the cell phone or device and the areas to be covered during the search are retained in the cell phone's or device's memory. A unique feature of the present invention enables a searcher to quickly indicate a specific need or service at a particular location during the search. Areas that have been searched during the day are downloaded to a base unit and areas to be searched the following day or days are uploaded to the cell phone or portable device at the beginning of the next day. All of this is accomplished employing wireless technology. Push to talk radios on units also would enable the searchers to audibly communicate with each other. This software also permits the information on the cell phone with GPS to be down loaded to "servers" when the cell phone with GPS is within Bluetooth® communication range. This system relies upon common software designs which can incorporate elements of Lennox, Windows, Java, and other technologies programmed into this application to allow the cell phones to optimize their effectiveness.

Accordingly, it is an objective of the instant invention to provide a cell phone equipped with GPS and which has software to enable GPS functions with Bluetooth to enable a responder or other individual to navigate and search a specific area after landmarks and other reference points have been eliminated or destroyed.

It is a further objective of the instant invention to provide a cell phone equipped with GPS and having CGPS functions with Bluetooth® that records the operation's areas covered by a responder or individual during a day or other period of time. The tracks can be overlaid on to other units' tracks in the base station.

It is yet another objective of the instant invention to provide a cell phone provided with GPS and having GPS functions with Bluetooth® that downloads areas not covered during a search to a base unit and receives uploads of different areas to be searched the next day or time period via wireless technology.

It is a still further objective of the invention to provide a cell phone equipped with GPS and having GPS functions with Bluetooth® to have audible communication with other responders or individuals.

It is yet a further objective of the instant invention to provide a cell phone equipped with GPS and having GPS functions with Bluetooth® which can indicate the locations of other similar devices without input from the operators of the other devices. Real time tracking is thus achieved as well.

It is yet a further objective of the invention to provide cell phone equipped with GPS and having GPS functions with Bluetooth® which can automatically download data stored on the cell phone to a computer which acts as a "server", when the cell phone is within Bluetooth® communication range of the "server". Any type of computer, including a laptop, can function as a "server". Therefore, the cell phones are "talking" directly to the "server" computers without the use of cell towers or use of the Internet. This would be the type of situation that exists when a disaster has occurred.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 10 is a flow diagram of the procedure utilized by insurance company adjusters.

DETAILED DESCRIPTION OF THE INVENTION

Figure 1:
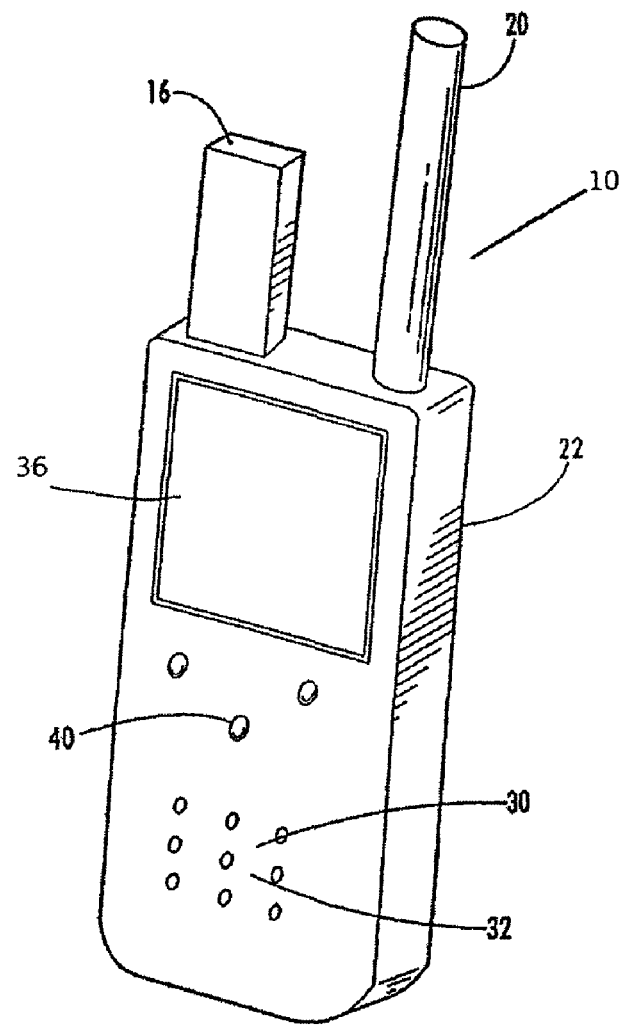
FIG. 1 is a perspective view of a combined GPS/radio device according to a preferred embodiment of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2A:
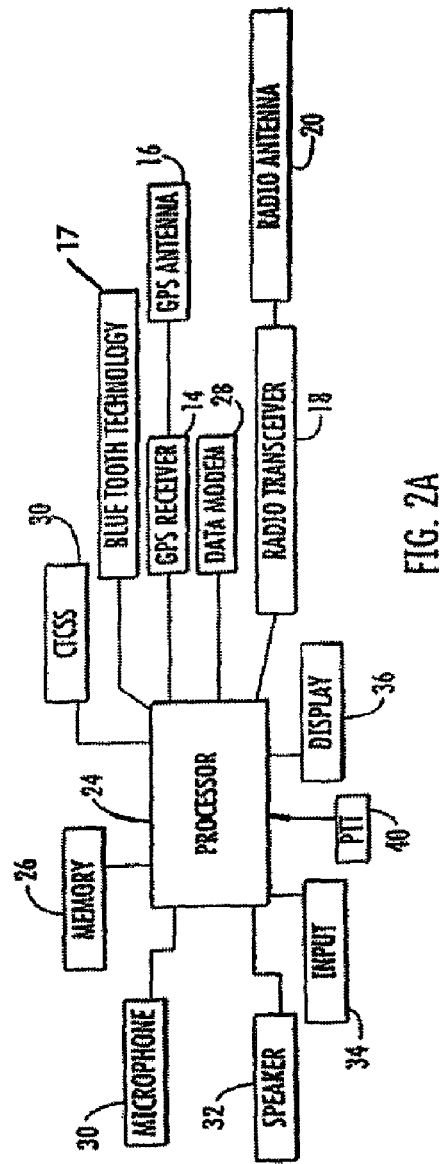
FIG. 2A is a block diagram of the components of the GPS/radio of FIG. 1.
Figure 2B:
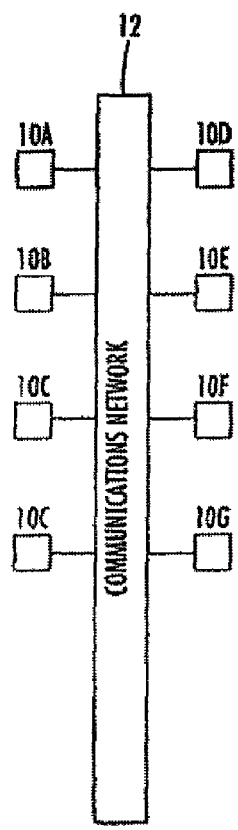
FIG. 2B is a block diagram of a communications network linking the GPS/radio unit of FIG. 1 with a plurality of other GPS/radio units.

A portable GPS receiver is combined with a radio transceiver into one unit 10 in a preferred embodiment of the present invention as illustrated in FIG. 2A. A plurality of other similar GPS/radio units 10A-10G communicate with each other utilizing a communications network 12, as illustrated in FIG. 2B. The GPS/radio units 10A-10G determine their various locations utilizing GPS and can then transmit these locations to the other units over a wireless network. In this manner the locations of all the units can be determined and monitored by any one of the units. The preferred embodiment of the present invention is also provided with a radio. The units can also communicate with each other over a public radio network such as FRS or GMRS or IDENT.

Referring to FIGS. 1 and 2A the GPS/radio of the present invention will now be described. The GPS/radio unit 10 includes a GPS receiver 14, a GPS antenna 16, a Bluetooth® technology feature 17, a radio transceiver 18 and an antenna 20 all mounted in or on the GPS/radio housing 22. The GPS receiver is electronically coupled to processor 24 which in turn is electronically coupled to a memory 26. The memory 26 can be built into the unit 10 or removably connected thereto, such as a flash memory stick or removable cartridge (both not shown). The memory will normally contain the information necessary to operate the unit 10. The memory can also be used to store cartographic data (electronic maps), waypoints or locations which the unit's operator wants to save, waypoints of the other units and other data which may be input into the unit 10. The radio transceiver 18 is electronically coupled to the processor 24 and a data modem 28. The data modem is utilized for transmitting and receiving data such as location data of the units. The Bluetooth technology feature enables wireless communication between different GPS/radio units and base stations.

The electronic maps stored on the removable memory devices can be readily displayed on the unit's display 36. Waypoints or areas traversed by the unit and stored in the memory can also be displayed on the display 36. In a preferred embodiment, the display 36 is a liquid crystal display (LCD) and is used to display other information in addition to navigational information. Any other type of display may also be used. The unit 10 also includes a microphone 30, a speaker 32 and an input 34. The microphone 30 and speaker 32 are conventional and can be the same type of microphone and speaker used on a conventional FRS or GMRS radio.

Input 34, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 34 could also be a microphone, a voice recognition input, a touch screen, a full keyboard similar to a Blackberry® or a menu driven display screen.

The GPS/radio unit also could include a continuous tone coded squelch system (CTCSS) 38 and a push-to-talk button 40. The CTCSS controls the audio output of the speaker so that only a desired transmission can be heard by the user of the unit 10. The push-to-talk button 40 can be any conventional pushbutton switch or control device normally found on short range two-way radios. The push-to-talk button 40 is coupled with the processor 24 to combine two important functions in a single button. The push-to-talk button 40 is operable to both initiate transmission of voice communications and transmission of a radio signal which indicates the GPS location of the unit. Additionally this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 24 keeps the radio transceiver enabled for approximately 100-300 milliseconds to allow the transmission of the location data. The GPS/radio unit 10 can also include another feature which enables other individuals to determine its location. This is a "polling" feature wherein one unit 10 sends a request to the other units 10A-10G for them to transmit their locations back to the requesting unit. This request can be performed manually by the operator of the requesting unit 10 or the requesting unit can be programmed to perform this operation automatically at pre-selected time intervals. The locations of the other units 10A-10G are updated on the electronic map of the requesting unit so that at any time all the units can know where all the other units are. Any and all of the units can perform this location request. If the units are programmed to perform this automatically, then no input is required by any of the operators.

Another optional feature of the GPS/radio unit is a coding or encryption system. This system can employ any of the known coding or encryption schemes such as public or private key encryption methods. To employ this feature a group of GPS/radio users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

GPS/radio units which include all of these features are complicated to operate and numerous intricate operational procedures must be memorized and/or deciphered to obtain the desired results. Many individuals who are involved in search operations after disasters such as hurricanes are ordinary individuals who are not familiar with the operation of these GPS/radio units. Therefore, for the search missions to be successful, these units need to be modified so that anyone could readily operate them.

The first modification is a modification of the hardware. This modification involves equipping the units with a Bluetooth® communication system. This communication system enables the rapid transfer of large amounts of data wirelessly between devices within a close proximity (10-20 feet). This wireless communication system enables software modifications of the GPS/radio unit, which in turn enable uncomplicated operation of the unit, and transmission of data between the portable GPS/radio unit and a base station.

Using as an example a Garmin Rhino 500 series GPS/radio the following modifications to the software in the unit are made prior to its use in the search operations. Once these modifications have been made they do not need to be changed until the units are returned to normal service. These modifications can be made utilizing Bluetooth® communications from a base station.

First the GPS/radio unit are uploaded with the following information:
User name.
User symbol.
GMRS channels to be used—one national emergency frequency.
FRS channels to be used.
CTCSS code for each team.
CTCSS code for the task force.
A list of radio frequencies to scan which only include those listed above.
Next the radio is set up with the following parameters:
Sending location.
Permit polling function.
GMRS power level.
Scramble codes.
Repeater channels.
Headset type—Bluetooth® enabled.
VOX level.
Microphone sensitivity.
Next the following tones are selected and activated:
Call tone.
Roger tone.
Ring tone.
Vibrate.

Message beep.
Key beep.
Power beep.
Turn warning.
Next the new contact page overview data is provided:
Only the team members plus the base station.
Identify the Team Leader's unit.
Next the main page functions are set:
A position icon for the base unit is selected.
A position icon for the team leader is selected.
A position icon for the team members is selected.
A single county map is entered into the unit.
The pan map feature is turned off.
The navigate function is turned on.
The recalculate feature is turned off.
The data fields are turned off.
The guidance text is turned off.
The set up map is pre-set.
The measure distance feature is turned off.
The declutter feature is turned on.
Next the data fields are completed:
The options are pre-programmed.
The guidance text is turned off.
The map is set up.
In the general set up, North is selected as up.
In the track set up, the scale is selected.
In the map points, the scale is selected.
The Text is set up.
The map information is entered.
The measure distance feature is deleted.
The compass is deleted.
Next the main page is changed.
The satellite page is deleted.
The trip computer page is deleted.
The mark waypoints feature is turned on. Each waypoint name has an Emergency Support function (ESF) associated with it. There is also a 1-2 word descriptor for each waypoint.
The find menu is restricted to waypoints, the base and team contacts.
The track page is only for the team.
The routes page is only for the team.
The highway page is deleted.
The proximity page is deleted.
The calendar is delete.
The alarm clock is deleted.
The calculator is deleted.
The stop watch is deleted.
The sun and moon feature is deleted.
The hunt and fish feature is deleted.
The games are deleted.
Next the Tracks page is:
Pre-programmed daily.
The back track is pre-programmed.
The track log is pre-programmed.
Next on the Routes page:
Certain waypoints are pre-programmed.
The page is cleared daily after being downloaded.
The routing methods are pre-programmed.
Navigating a route is set only to a day by day target area.
The highway page is deleted.
Next the Setup page is pre-programmed to the above settings.
Next the display setup page is pre-programmed as follows:
The display mode is selected.
The color scheme is selected.
The backlighting time is chosen.
The backlight intensity is chosen.
Next the units set up page is deleted.
Next the LORAN TD format is deleted.
Next the Heading setup page is pre-programmed.
Next the Welcome setup page is pre-programmed.
Next the interface setup page is pre-programmed.
Finally the proximity waypoints are deleted.

After these modifications have been performed the team members go out into the designated search areas with their portable hand held GPS/radio units. At the beginning of every day a different route or search area is programmed into each unit. Preferably each team will have the same route or search area and different teams will have different routes or search areas. As the team members cover the routes or search areas they will encounter individuals or locations which require specific needs. These needs have been designated as Emergency Support Functions (ESF) and categorized with possible uses as follows (noting these ESF descriptions listed can vary state by state):

ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Logistics location including pharmaceutical supplies and medical personnel management; D-Mort service teams' and EMS personnel locations and assignments and precise locations.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security—incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint wherein a particular need or service has been identified by the searcher, a 1-2 word descriptor can also be associated with the waypoint. This would help to clarify any ambiguities that a third party may have regarding a particular way point and emergency service that was associated with the waypoint. These descriptors could also be used to identify a particular need or resource that would be required at a particular area or site.

Figure 3:
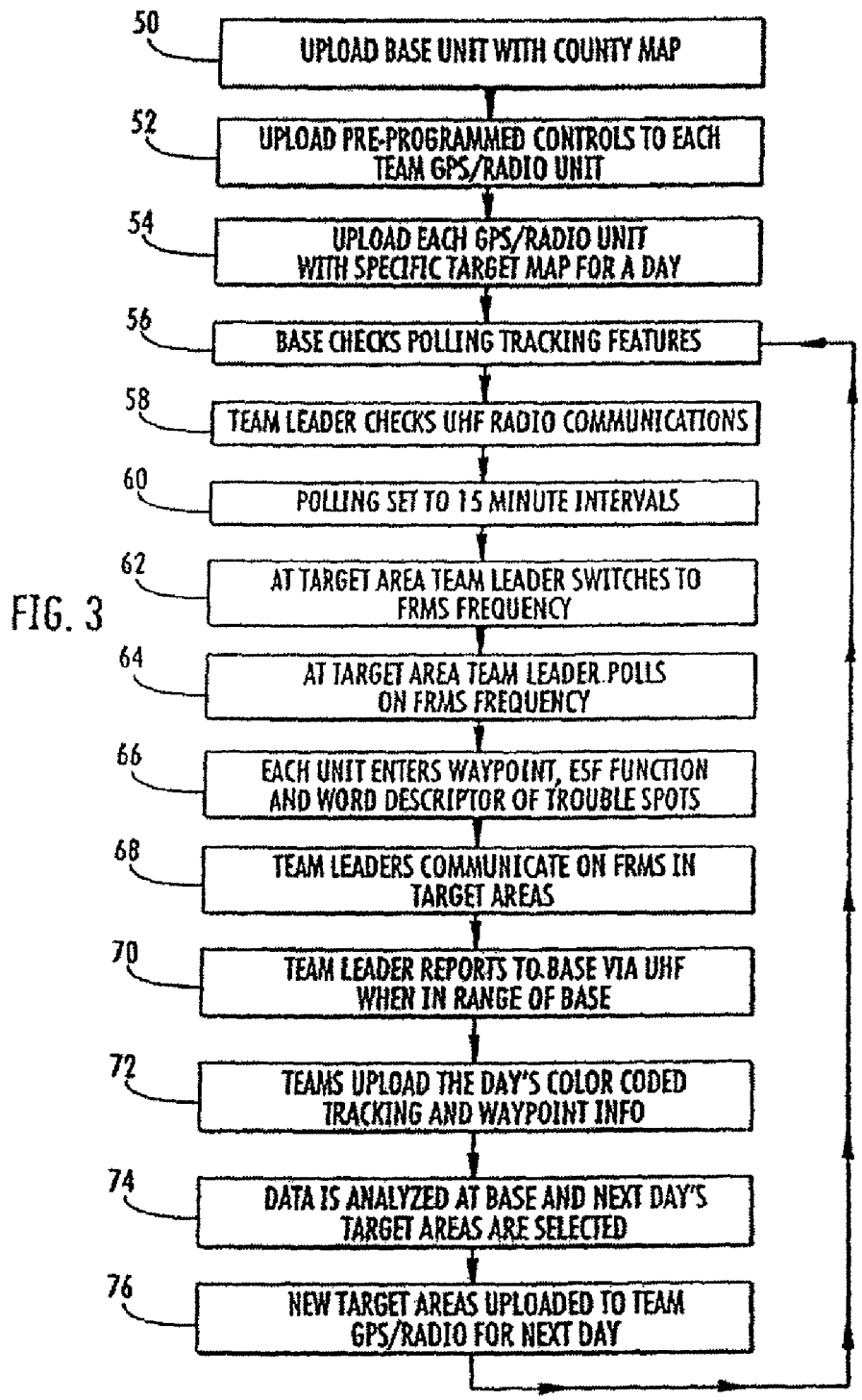
FIG. 3 is a flow diagram of the procedure utilized by the search and response teams.

With reference to FIG. 3 the operation of a typical search would proceed as follows. The base unit is uploaded with a map of the county or area surrounding the site of the disaster at 50. The individual team GPS/radio units are uploaded with pre-programmed controls and settings at 52. The individual team units are uploaded with a specific target search map for one day at 54. The base unit checks the polling tracking features of the units at 56. The team leader checks the radio communications between his unit, the team members units and the base station at 58. These radio communications can be in UHF, VHF or 800 MHz frequencies as well as the IDENT network. The polling feature of the field units is set for 15 minute intervals at 60. After the teams reach the target or search area, they switch their radios to operate on the FRS radio frequency at 62 or rely upon the IDENT system. The team leader polls the team members on the FRS frequency or IDENT during the searching operations at 64. Whenever they reach a trouble spot the team members enter a waypoint, ESF number and descriptor into their individual GPS/radio units at 66. The team leaders communicate with each other over the FRS frequency or IDENT while in the search area at 68. The team leader reports in to the base station over the UHF, VHF or 800 MHz frequencies or IDENT when they are within range of the base station at 70. The team members upload the routes covered, searched areas and waypoints from that day to the base station at 72. While the upload is preferably preformed wirelessly, any other type of data transfer is acceptable. These routes or search areas may be color coded. The data uploaded into the base station unit is analyzed and the next day's search areas or route are determined at 74. The new search areas or route are uploaded into the teams' individual GPS/radio units at 76 and the procedure then returns to step 56. While the new routes are preferably uploaded wirelessly, any other type of data transfer is acceptable.

Figure 4:
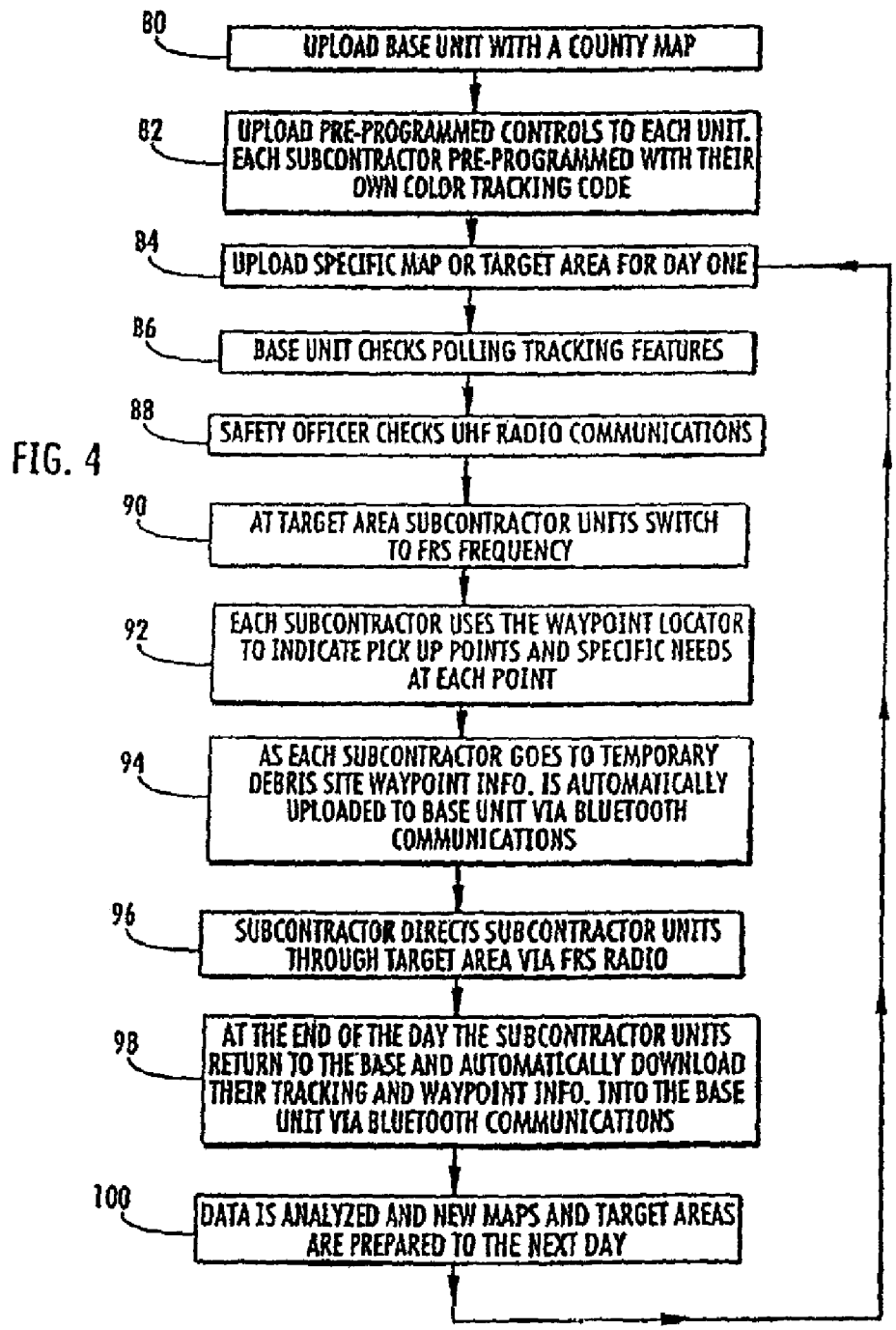
FIG. 4 is a flow diagram of the procedure utilized by a cleanup contractor.

With reference to FIG. 4 the procedure of a typical cleanup operation after a disaster is described. The base unit is uploaded with a map of the county or area surrounding the site of the disaster at 80. The subcontractors' units are pre-programmed with controls, settings and color codes at 82. The subcontractors' units are uploaded with a specific map or target area for the day at 84. The base unit checks the polling tracking feature of the individual units at 86 prior to dispatching the subcontractors. The safety officer checks the UHF, VHF or 800 MHz frequency or IDNET communications feature of the individual units at 88. Once within the target area the subcontractors' units are switched to operate on the FRS radio frequency or IDENT at 90. Each subcontractor uses the waypoint locator to indicate a pickup site and the specific needs at each site at 92. The subcontractors proceed to a temporary debris site within the target area. At this location the waypoint information which they have collected that day is downloaded to a unit at the temporary debris site via Bluetooth® communications at 94. This information is subsequently sent to a base station through the best methodology available during that moment in time. The subcontractor continues to direct the subcontractor units through the target area via FRS radio or IDENT at 96. At the end of the day the subcontractor units return to the base station and automatically download their tracking and waypoint information to a base station unit via Bluetooth® communications at 98. The data is analyzed and new maps and target areas are prepared for the next day's operation at 100 and the procedure then returns to step 84.

Figure 5:
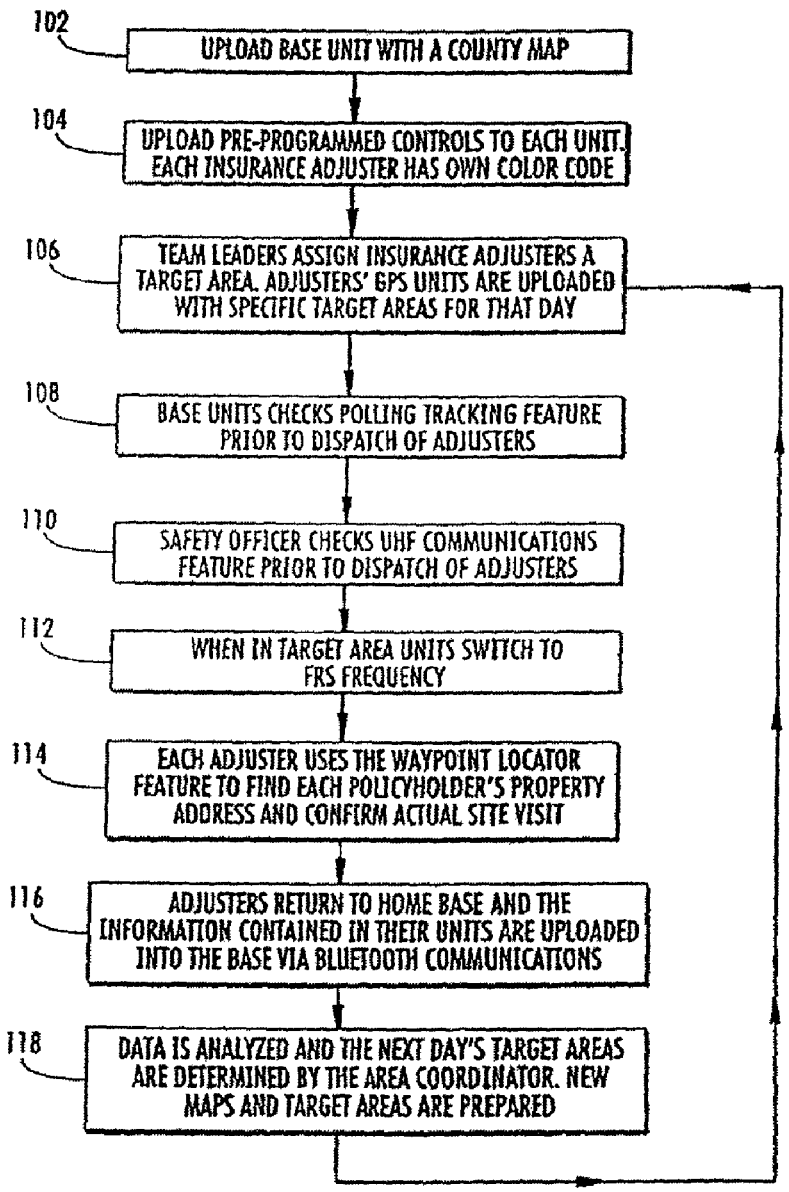
FIG. 5 is a flow diagram of the procedure utilized by insurance company adjusters.

With reference to FIG. 5 the operation of a typical insurance company's adjuster's visit to a disaster area is described. The base station unit is uploaded with a map of the county or area surrounding the site of the disaster at 102. The individual insurance adjusters' GPS/radio units are uploaded with pre-programmed controls, settings and color codes at 104. The team leaders assign the insurance adjusters a target area and the adjusters' GPS/radio units are uploaded with the specific target areas to be covered that day at 106. The base station unit checks the polling tracking feature of the adjusters' units at 108, prior to dispatching the adjusters. The safety officer checks the UHF, VHF or 800 MHz frequency radio or IDENT communications between the GPS/radio units at 110. After the insurance adjusters have entered the target area they switch their radios to operate on the FRS radio frequencies or IDENT at 112. Each insurance adjuster uses the waypoint locater feature of their GPS/radio unit to locate each policyholder's property address and confirm the actual visit to the site at 114. The adjuster can then make notes regarding damages to the property in their own computers or other devices. The insurance adjusters return to the base station and the information contained in their units is uploaded into the base station unit via Bluetooth® communications at 116. The data is analyzed and the following day's target areas are determined by the insurance coordinator. New maps and target areas are prepared for the following day at 118 and the procedure then returns to step 106.

In addition to the users listed above, this system can be employed by any and all members of a first responder services such as Homeland Security, the military, the National Guard, Hazardous Material teams, non-governmental responders, volunteer groups, long term recovery organizations, public works department personnel, all other ESF personnel, and the Emergency Management Assistance Compact (EMAC). These individuals and associations will normally use the present invention to assist in the recovery, assistance, and cleanup after natural disasters such as hurricanes, tornadoes, floods and snow storms. However, the present invention can be used for any situation wherein a number of people require assistance like fires, power blackouts, etc.

Figure 6:
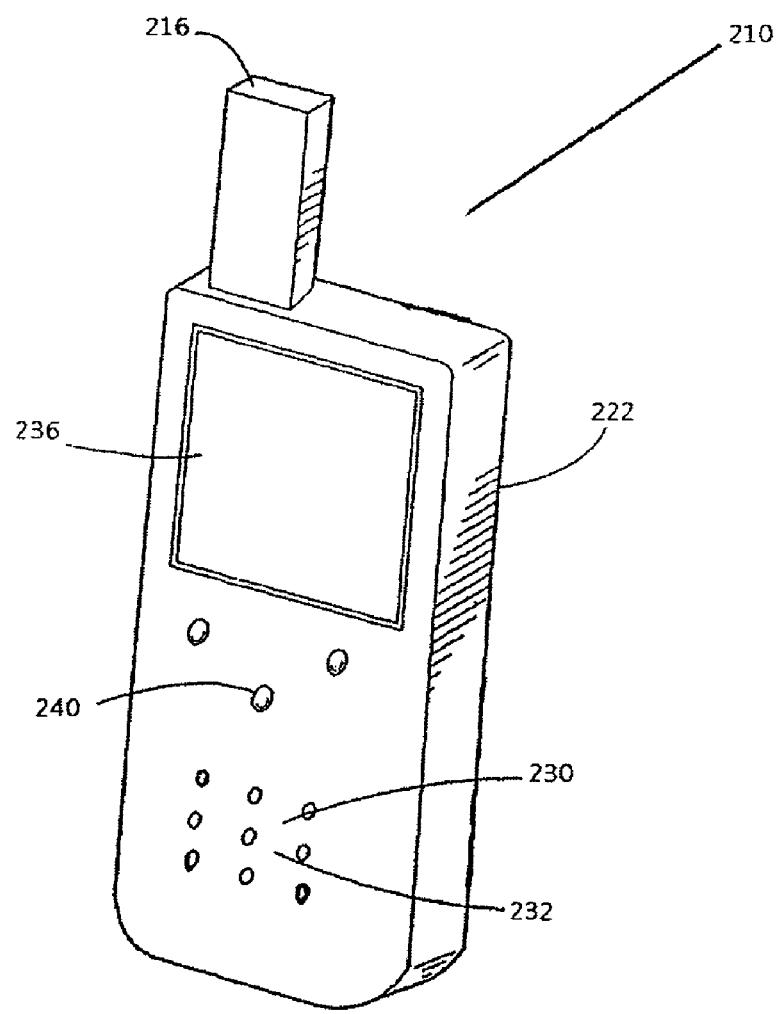
FIG. 6 is a perspective view of a cell phone with GPS and GPS functions with Bluetooth® according to a preferred embodiment of the present invention.
Figure 7B:
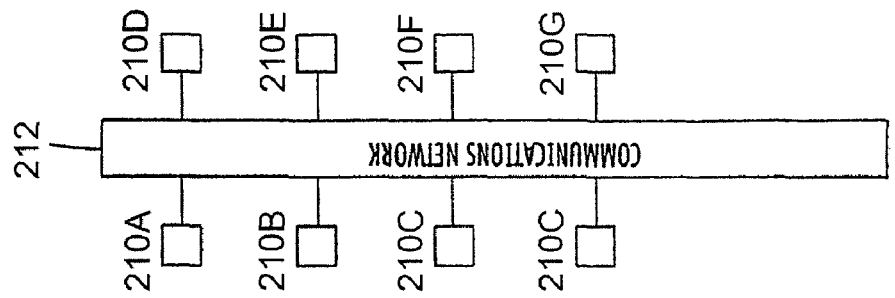
FIG. 7B is a block diagram of a communications network linking the cell phone of FIG. 6 with a plurality of other cell phones.

A portable cell phone equipped with GPS and GPS functions/capabilities as well as Bluetooth® is illustrated in FIG. 6 as 210 as a preferred embodiment of the present invention. A plurality of other similar cell phones 210A-210G communicate with each other utilizing a communications network such as cell towers 212, as illustrated in FIG. 7B. The cell phones with GPS 210A-210G determine their various locations utilizing GPS and can then transmit these locations to the other units over a network, if it is functioning. If the cellular network is not functioning, the center of the communications network shown on FIG. 7B as 212 becomes a server and or laptop "server," instead of the cell tower system being the communications network. Either way, when the units are within range of a network, 212 all the units 210A-210G can be determined and monitored by any one of the units.

Figure 7A:
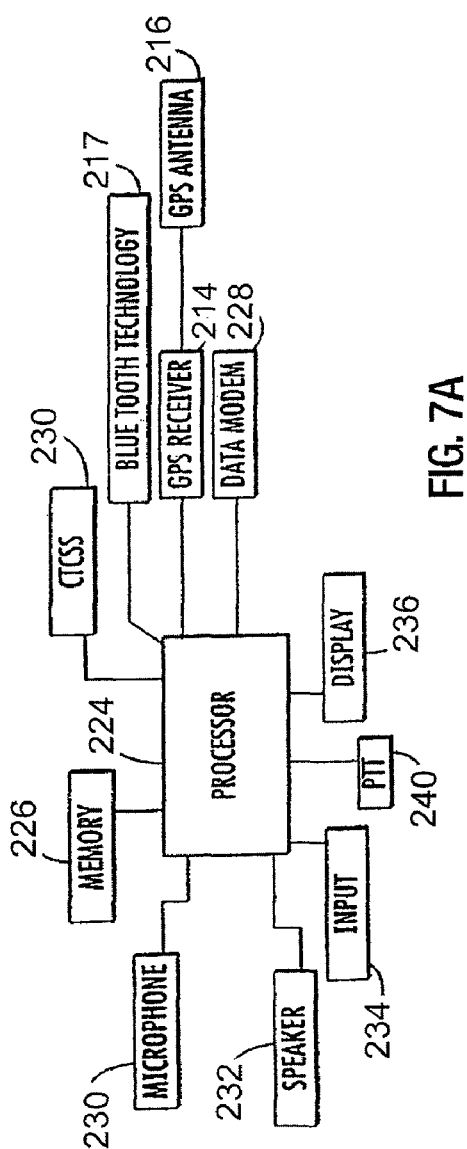
FIG. 7A is a block diagram of the components of the cell phone of FIG. 6.

Referring to FIGS. 6 and 7A the cell phone with GPS of the present invention will now be described. The cell phone with GPS unit 210 incorporating Bluetooth® technology includes a GPS receiver 214, a Bluetooth® technology feature 17, and a GPS antenna 216 mounted in or on the cell phone housing 222. The GPS receiver is electronically coupled to processor 224 which in turn is electronically coupled to a memory 226. The memory 226 can be built into the unit 210 or removably connected thereto, such as a flash memory stick or removable cartridge (both not shown). The memory will normally contain the information necessary to operate the unit 210. The memory can also be used to store cartographic data (electronic maps), waypoints or locations which the unit's operator wants to save, bread crumbs of the operator's tracks, waypoints of the other units and other assessment data which may be input into the unit 10. The cell phone is electronically coupled to the processor 224 and a data modem 228. The data modem is utilized for transmitting and receiving data such as location data of the units. The Bluetooth technology feature enables wireless communication between different GPS/radio units and base stations.

The electronic maps stored on the removable memory devices can be displayed on the unit's display 236. Waypoints or areas traversed by the unit and stored in the memory can also be displayed on the display 236. In a preferred embodiment, the display 236 is a liquid crystal display (LCD) and is used to display other information in addition to navigational information. Any other type of display may also be used on the cell phone. The unit 210 also includes a microphone 230, a speaker 232 and an input 234. The microphone 230 and speaker 232 are conventional.

Input 234, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 234 could also be a microphone, a voice recognition input, a touch screen, a full keyboard similar to a Blackberry® or a menu driven display screen.

The cell phone with GPS unit 210 can also include a continuous tone coded squelch system (CTCSS) 238 and a push-to-talk button 240. The CTCSS controls the audio output of the speakers so that only a desired transmission can be heard by the user of the cell phone 210. The push-to-talk button 240 can be any conventional pushbutton switch or a control device normally found on short range two-way radios. The push-to-talk button 240 is coupled with the processor 224 to combine two important functions in a single button. The push-to-talk button 240 is operable to both initiate transmission of voice communications and transmission of a radio signal which indicates the GPS location of the unit. Additionally this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 224 keeps the radio transceiver enabled for approximately 100-300 milliseconds to allow the transmission of the location data. The cell phone with GPS unit 210 can also include another feature which enables other individuals to determine its location. This is a "polling" feature wherein one unit 10 sends a request to the other units 10A-10G for them to transmit their locations back to the requesting unit. This request can be performed manually by the operator of the requesting cell phone 210 or the requesting unit can be programmed to perform this operation automatically at pre-selected time intervals. The locations of the other cell phones 210A-210G are updated on the electronic map of the requesting unit so that at any time all the units can know where all the other units are. Any and all of the units can perform this location request. If the units are programmed to perform this automatically, then no input is required by any of the operators.

Another optional feature of the cell phone with GPS is a coding or encryption system. This system can employ any of the known coding or encryption schemes such as public or private key encryption methods. To employ this feature a group of cell phone users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

Cell phones with GPS units which include all of these features are complicated to operate and numerous intricate operational procedures must be memorized and/or deciphered to obtain the desired results. Many individuals who are involved in search operations after disasters such as hurricanes are ordinary individuals who are not familiar with the operation of these cell phones. Therefore, for the missions to be successful, these units need to be modified so that anyone could readily operate them.

The first modification is a modification of the hardware. This modification involves equipping the cell phones with a Bluetooth® communication system. This communication system enables the rapid transfer of large amounts of data wirelessly between devices within a close proximity (10-20 feet). This wireless communication system enables software modifications of the cell phone, which in turn enable uncomplicated operation of the unit, and transmission of data between the cell phone and a base station server. A laptop computer can be positioned at the base station and can also serve as a "server" in this communications network.

Using as an example the Sanyo Model 7050, Pro 200 or 700 cell phones, the following modifications to the software in these cell phones are made prior to its use in the operations. Once these modifications have been made they do not need to be changed except as the user goes into and out of a working cellular network (or the network is re-established by repairs). These modifications can be made utilizing Bluetooth® communications from a base station or on the cell phone unit itself if the model has such capability. As another example, a Blackberry® Curve Model 3330 GPS/cell phone can also be used when modified as stated above, and with additional programming and/or modifications as well as newly developed cell phone hardware, a host of other phones can utilize this system.

First the cell phones with GPS and Bluetooth® are uploaded with the following information:

Pathfinder Task Force software which contains the following options:

"Work Orders": these can be tasked out to individual cell phones. Detailed information such as location, specific needs, tasks, or any "work" duties can be sent from the server to one or multiple cell phones. Once sent to a phone or phones, the operator has the ability to comment and enter in completion information on the work order, which then can be transmitted back to the base server.

"Forms": which can be customized readily on the laptop "server" at the base station and which integrate the text messaging feature of cell phones to complete certain information on the forms such as name and address. Comment sections can allow the user to enter any texted wording the operator desires. Alternatively the forms can employ dropdown menus for pre-programmed answers which can be selected to standardize certain responses so as to increase the speed of entry of data by filed operators. For example, there can be a "minor damage or major damage" drop down option to select. When the form is submitted to be saved into the phone (or into the server if the cellular network is functioning), the system automatically geocodes and time/date stamps the information contained on that specific form. Prior to saving the form, the user is asked if the form needs any final editing before being saved.

"Synch Now": allows the user to synch with a system by utilizing either Bluetooth® or cellular networks.

"Start Break": allows the user to note a break time start and stop point to monitor his/her work cycle during the operations.

"Message": allows the cell phone operator or base server to text message each other or other operators via a canned, preprogrammed or custom message. Text messaging in a disaster environment can occur over partially destroyed cellular networks where voice communication has failed entirely.

"Setup": allows the user to enter in their cell phone phone number and company name or name of the agency for which they are working.

"Change User": allows the user to change his/her password or user name.

"GPS": allows the user to check the status of the GPS tracking unit and note any errors in communication of the GPS chip within the cell phone.

"Clock in or out": allows the user to log into or out of the system.

"Map": allows the user to view a map as loaded by the system into the cell phone.

"Bluetooth® Synch": allows the user to toggle between using just Bluetooth® or just the cellular phone network, depending on the circumstances.

"Diagnostics": allows the user to view his/her name, phone number, software application name, version of the software application, synch interval, last synch time, last upload time, number of synchs synch errors and message counts.

"About": allows the user to view the name of the system and the version, along with a copyright date.

"Shutdown": allows the user to shutdown the Pathfinder Task Force Application.

After an operational duty has been inputted, with any related maps, the responder goes out into the designated search areas with the cell phone which has GPS features and functions. At the beginning of every day a different route or search area is programmed into each cell phone. Preferably each team will have the same route or search area and different teams will have different routes or search areas. As the team members cover the routes or search areas they will encounter individuals or locations which require specific needs. These items can be inputted into the cell phone in the methods described above.

The system also can recognize and list the Emergency Support Functions (ESF) and categorized with possible uses as follows:

ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Perform health services and logistics location including pharmaceutical supplies and medical personnel management, D-Mort service teams and EMS personnel locations and assignments.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security—incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint wherein a particular need or service has been identified by the searcher, a 1-2 word descriptor can also be associated with the waypoint. This would help to clarify any ambiguities that a third party may have regarding a particular way point and emergency service that was associated with the waypoint. These descriptors could also be used to identify a particular need or resource that would be required at a particular area or site.

Figure 8:
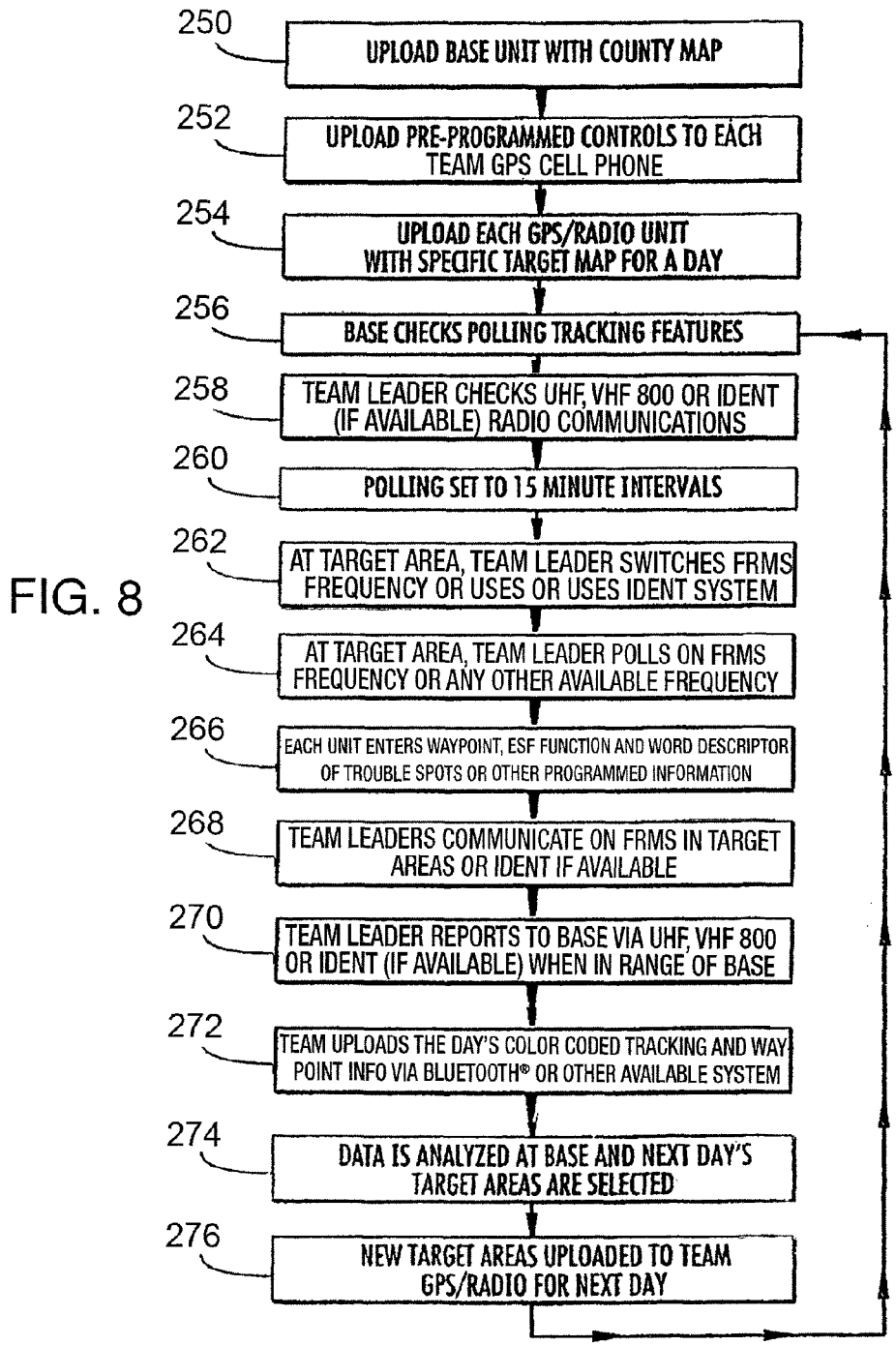
FIG. 8 is a flow diagram of the procedure utilized by the response teams.

With reference to FIG. 8 the operation of a typical search would proceed as follows. The base unit is uploaded with a map of the county or area surrounding the site of the disaster at 250. The individual team cell phones are uploaded with the Pathfinders task Force software and with pre-programmed controls and settings at 252. The individual team units are uploaded with a specific target search map for one day at 254.

The team members upload the routes covered, searched areas, assessment data, and waypoints from that day to the base station at 272. While the upload is preferably preformed wirelessly, any other type of data transfer is acceptable. These routes or search areas may be color coded. The data uploaded into the base station unit is analyzed and the next day's search areas or route are determined at 274. The new search areas or route are uploaded into the teams' individual cell phones at 276 and the procedure then returns to step 256. While the new routes are preferably uploaded wirelessly, any other type of data transfer is acceptable.

The data is mapped out on GIS mapping system which allows shape files to be overlaid for a more robust analysis. Further, the latitude-longitude information can be readily converted automatically within the system to the National Grid System which is used more by military responders. Additionally, the system can easily convert all of the collected data into Excel spread sheets, which then are easily sorted using Excel technologies. Data can then be e-mailed out in a readily workable solution and/or can be converted into pie charts or other graphic images using Microsoft Access® to present a snapshot picture of thousands of data inputs from a single or multiple day's operations.

Figure 9:
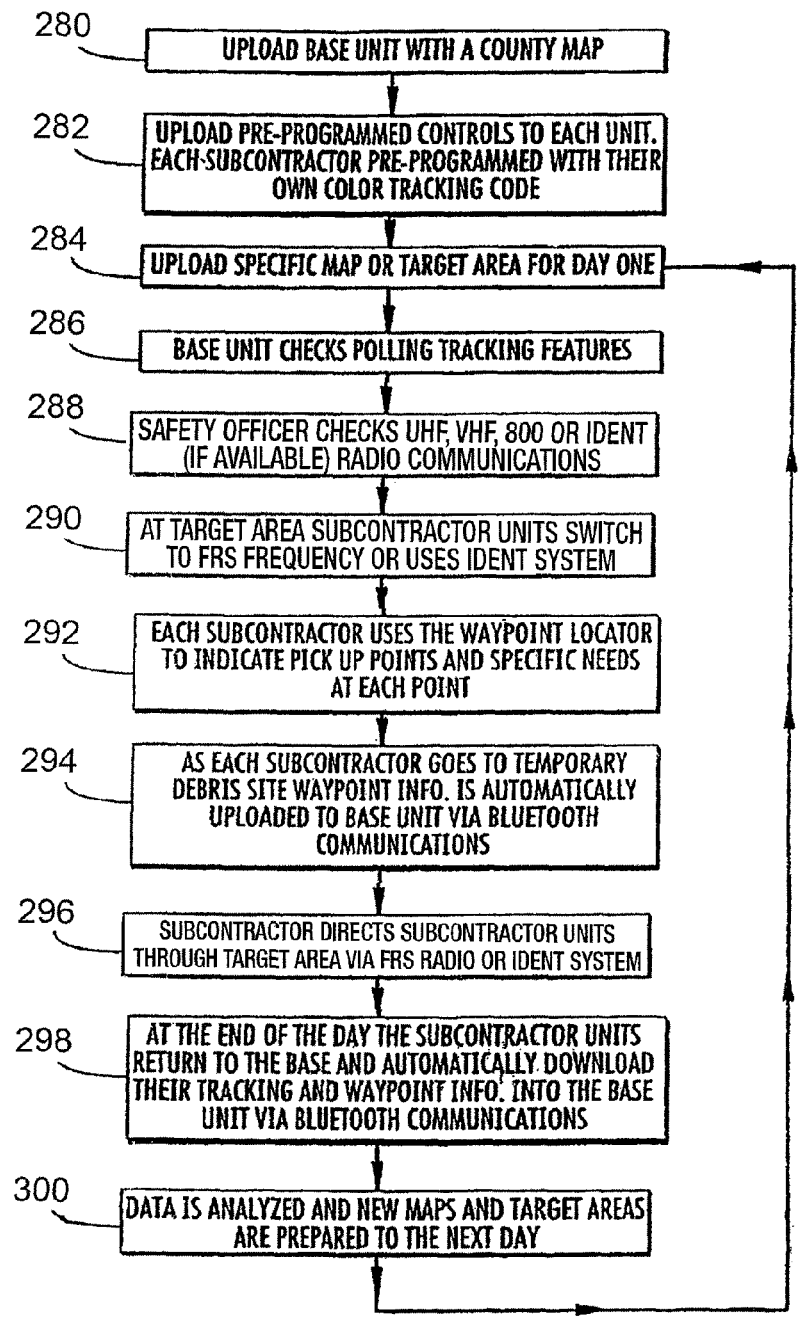
FIG. 9 is a flow diagram of the procedure utilized by a cleanup contractor.

With reference to FIG. 9 the procedure of a typical cleanup operation after a disaster is described. The base unit is uploaded with a map of the area surrounding the site of the disaster at 280. The subcontractors' units are pre-programmed with Pathfinders Task Force software and with controls, settings and color codes at 282. The subcontractors' units are uploaded with a specific map or target area for the day at 284. The safety officer checks the UHF, VHF or 800 MHz frequency communications or IDENT features of the individual cell phones at 288. The subcontractors proceed to a temporary debris site within the target area. At this location the waypoint information which they have collected that day is downloaded to a unit at the temporary debris site via Bluetooth® communications at 294. This information is subsequently sent to a base station. At the end of the day the subcontractor units return to the base station and automatically download their tracking and waypoint information to a base station unit via Bluetooth® communications at 298. The data is analyzed and new maps and target areas are prepared for the next day's operation at 300 and the procedure then returns to step 284.

With reference to FIG. 10 the operation of a typical insurance company's adjuster's visit to a disaster area is described. The base station unit is uploaded with a map of the area surrounding the site of the disaster at 302. The adjuster's units are pre-programmed with Pathfinders Task Force software and with controls, settings and color codes at 304. The team leaders assign the insurance adjusters a target area to be covered and the adjusters' cell phones are uploaded with pre-programmed controls, settings and color codes at 306. Each insurance adjuster uses the waypoint locater feature of their cell phone with GPS to locate each policyholder's property address and confirm the actual visit to the site at 314. The adjuster can then make notes regarding damages to the property in their own computers or other devices. The insurance adjusters return to the base station and the information contained in their units is uploaded into the base station unit via Bluetooth® communications at 316. The data is analyzed and the following day's target areas are determined by the insurance coordinator. New maps and target areas are prepared for the following day at 318 and the procedure then returns to step 306.

In addition to the users listed above, this system can be employed by any and all members of a first responder services such as Homeland Security, the military, the National Guard, Hazardous Material teams, non-governmental responders, volunteer groups, long term recovery organizations, public works department personnel, all other ESF personnel, and the Emergency Management Assistance Compact (EMAC). These individuals and associations will normally use the present invention to assist in the recovery, mitigation, and preparedness for natural disasters such as hurricanes, tornadoes, floods and snow storms. However, the present invention can be used for any situation wherein a number of people require assistance like fires, power blackouts, etc.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. In a system comprising:
 a receiver receiving signals from a plurality of satellites;
 a cellular telephone transmitting voice communications to and receiving voice communications from other cellular telephones;
 a processor coupled to said receiver which calculates a location of said receiver from said satellite signals, said processor including means to receive data;
 a storage device coupled to said processor, said storage device storing data representative of waypoints, routes, maps and data supplied by a user;
 said means to receive data comprises an input device coupled to said processor for receiving data supplied by a user, said data including waypoints and information related to each said waypoint;
 means for transmitting to a base station a plurality of waypoints that have been traversed during a period of time via wireless technology;
 said cellular telephone including a polling device, said polling device includes means for sending a signal to a server or other cellular telephones in the reception area and said other cellular telephones, in response to receiving said signal, broadcasting their way point to said cellular telephone sending said signal, said signal includes a GPS position or location; and said information related to each said waypoint can include an emergency support function (ESF) designation, whereby the locations of said other cellular telephones can be determined on a map based on said waypoints received by the server.

2. The system of claim 1, wherein said means for transmitting to said base station a plurality of waypoints that have been traversed during a period of time comprises a wireless communication system.

3. The system claim 1, wherein said base station includes means to enter a different map and route into said receiver subsequent to returning to said base station.

4. The system of claim 1 wherein said base station can be comprised of a server system or a laptop computer acting as a server.

5. In a system a method effective for coordinating operations including:
   receiving signals from a plurality of satellites;
   transmitting voice communications to and receiving voice communications from cellular telephones;
   a processor coupled to a receiver which receives said signals from said plurality of satellites for calculating a location of said receiver from said satellite signals, said processor including input means to receive data from a user;
   inputting data representative of waypoints, routes, maps and information supplied by said user to said processor, said data including said waypoints and information related to each said waypoint;
   storing said data representative of said waypoints, routes, maps and information supplied by said user on a storage device coupled to said processor;
   transmitting to a base station a plurality of said waypoints that have been traversed during said period of time and said information related to each said waypoint;
   activating a polling feature of said GPS receiver wherein said polling feature determines the locations of other GPS receivers without input from the operators of said other GPS receivers; and
   emergency support function (ESF) designations are entered into said processor,
   whereby coordination of said operations are accomplished.

6. The method of claim 5, wherein a different map and route is entered into said GPS receiver subsequent to returning to said base station.

* * * * *